United States Patent
Huttunen

(10) Patent No.: US 6,438,185 B1
(45) Date of Patent: Aug. 20, 2002

(54) SELF-OPTIMIZING CHANNEL EQUALIZATION AND DETECTION

(75) Inventor: Mikko Huttunen, Espoo (FI)

(73) Assignee: Nokia Networks Oy, Espoo (FI)

( * ) Notice: Subject to any disclaimer, the term of this patent is extended or adjusted under 35 U.S.C. 154(b) by 17 days.

(21) Appl. No.: 09/657,219

(22) Filed: Sep. 7, 2000

Related U.S. Application Data

(63) Continuation of application No. PCT/FI99/00219, filed on Mar. 22, 1999.

(30) Foreign Application Priority Data

Mar. 22, 1998 (FI) .................................................. 980653

(51) Int. Cl.$^7$ ............................. H04B 1/06; G06F 11/10
(52) U.S. Cl. ...................................... 375/350; 375/232
(58) Field of Search ................................. 375/350, 229, 375/232, 231, 340, 341

(56) References Cited

U.S. PATENT DOCUMENTS

| | | | |
|---|---|---|---|
| 5,224,127 A | | 6/1993 | Okanoue |
| 5,263,033 A | | 11/1993 | Seshadri |
| 5,285,480 A | | 2/1994 | Chennakeshu |
| 5,345,452 A | * | 9/1994 | Matui ............................ 371/43 |
| 5,537,439 A | * | 7/1996 | Choi ............................ 375/232 |
| 5,615,233 A | | 3/1997 | Baum et al. |
| 5,675,590 A | * | 10/1997 | Alamouti ....................... 371/43 |
| 5,774,504 A | * | 6/1998 | Huszar et al. ............... 375/341 |
| 5,805,480 A | | 9/1998 | Greenberg |
| 5,818,876 A | * | 10/1998 | Love ............................ 375/341 |
| 5,862,192 A | * | 1/1999 | Huszar et al. ............... 375/347 |
| 5,905,969 A | * | 5/1999 | Mokbel et al. .............. 704/203 |
| 6,134,277 A | * | 10/2000 | Shah ............................ 375/341 |
| 6,301,684 B1 | * | 10/2001 | Watanabe et al. ........... 714/796 |

FOREIGN PATENT DOCUMENTS

| EP | 0550143 | 7/1993 |
|---|---|---|
| EP | 0804007 | 10/1998 |

OTHER PUBLICATIONS

Hiroshi Kubo, Keishi Murakami and Tadashi Fujino; "Adaptive Maximum–Likelihood Sequence Estimation by Means of Combined Equalization and Decoding in Fading Environments"; IEE Journal on Selected Areas in Communications, Jan. 1995, vol. 13, No. 1, pp. 102–109.
International Search Report for PCT/FI99/00219.

* cited by examiner

*Primary Examiner*—Chi Pham
*Assistant Examiner*—Dung X. Nguyen
(74) *Attorney, Agent, or Firm*—Altera Law Group, LLC

(57) ABSTRACT

A self-optimizing channel equalization and detection method and a channel equalizer/detector (14) implementing the method, the method comprising receiving a signal (RFI), taking samples of the signal within each symbol period over a timeslot, calculating reference constellation points within each symbol period on the basis of a channel estimate, updating the channel estimate within each symbol period on the basis of an error between each sample point and the reference constellation point, the error having been processed by one or more adaptivity parameters, and defining, for bit detection, the signal path having the best error metrics in the timeslot on the basis of the error metrics calculated from the sample points on the basis of the channel estimate. One or more adaptivity parameters used in channel estimate update are updated by timeslots in a direction which tends to decrease the error metrics of the best defined signal path within a single-timeslot or multiple-timeslot observation period when being compared with the error metrics of a corresponding path in a previous timeslot.

12 Claims, 3 Drawing Sheets

SELF-OPTIMIZING CHANNEL EQUALIZATION AND DETECTION

This application is a continuation of international application serial number PCT/FI99/00219, filed Mar. 22, 1999.

BACKGROUND OF THE INVENTION

The invention relates to a self-optimizing channel equalization and detection method comprising receiving a signal, taking samples of the signal within each symbol period over a timeslot, calculating reference constellation points within each symbol period on the basis of a channel estimate, updating the channel estimate within each symbol period on the basis of an error between each sample point and the reference constellation point, the error having been processed by one or more adaptivity parameters, and defining; for bit detection, the signal path having the best error metrics in the timeslot on the basis of the error metrics calculated from the sample points on the basis of the channel estimate.

When information is transferred on a radio channel, the signal to be transmitted has to be subjected to modulation. Modulation converts the signal into a form in which it can be transmitted at radio frequency. A modulation method can be considered efficient for instance if it allows as much information as possible to be transferred at as narrow a frequency band as possible. Depending on the purpose of use, other features can also be emphasized. Modulation should also cause as little interference as possible to adjacent channels.

Modulation methods include e.g. $\pi/4$-DQPSK ($\pi/4$-shifted, Differential Quaternary Phase Shift Keying) modulation. This modulation method comprises eight phase states, but only four phase shifts. Allowed phase shifts (symbols) are $\pm\pi/4$ and $\pm 3\pi/4$. FIG. 3A shows the modulation phase shift diagram (constellation). Each phase shift corresponds to two bits to be transmitted. In other words, a digital signal modulates the carrier in two-bit periods so that a given phase shift during each symbol period corresponds to a given two-bit combination. A symbol period refers to a signal period employed in the transmission of two bits. Phase shifts corresponding to bit combinations 00, 01, 10 and 11 are $\pi/4$, $3\pi/4$, $-\pi/4$ and $-3\pi/4$. The symbol frequency used in e.g. the TETRA system (Terrestrial Trunked Radio) is 18 kHz. the bit frequency being 36 kHz.

When a signal is being received, it has to be demodulated in order for the information therein to be detected. However, a signal transferred over the radio path can be distorted in various ways, thus complicating modulation detection. Signal-impairing phenomena include e.g. noise and intersymbol interference (ISI). A signal-distorting phenomenon also arises when a signal on a radio connection is reflected from various obstacles, such as buildings and irregularities in the terrain. In this case, the signal detected at a receiver is the sum of a plurality of propagation paths. Each propagation path is different in length and signals arrive at the receiver at different points of time, i.e. the delay varies. In addition, the movement of a vehicle causes frequency deviations in relation to speed, the deviations being called Doppler frequencies.

To correct signal distortions upon reception of a signal, various channel models for describing the signal-distorting properties of a channel are used in a receiver. In fact, a channel equalizer in a receiver uses such channel models to equalize channel-induced distortions. In other words, the channel equalizer acts as a kind of a filter. In the TETRA system, channel models include e.g. AWGN. RAx, TUx and HTx. AWGN is a static channel describing e.g. the connection between a stationary terminal and a base station in conditions not involving signal reflection. RAx refers to conditions in a rural area: flat terrain without reflections. X describes the speed of motion of a terminal. TUx refers to a typical urban environment having a relatively weak second beam which is reflected at a small delay. A typical speed in urban conditions is 50 km/h, and consequently a channel model TU50 is used to describe urban conditions. HTx., in turn, refers to conditions in a hilly terrain having a strong second beam which is reflected at a fairly long delay. The TETRA specifications define a channel model HT200, which consequently describes a vehicle moving in hilly terrain conditions at a speed of 200 km/h.

The problem in the above arrangement is that when a given channel model is used to optimize the channel equalizer of a receiver, the performance of the channel equalizer suffers in other types of conditions. The properties of radio channels typically vary continuously as a function of time, making pre-optimization of reception filtering impossible.

BRIEF DESCRIPTION OF THE INVENTION

It is an object of the invention to provide a method for solving the above problems. The objects of the invention are achieved by a method which is characterized by updating one or more adaptivity parameters used in channel estimate update within each timeslot in a direction which tends to decrease the error metrics of the best defined signal path within a single-timeslot or multiple-timeslot observation period when being compared with the error metrics of a corresponding path in a previous timeslot.

The invention is based on changing one or more adaptivity parameters used for channel estimate calculation in a way which allows the error metrics of the best signal path in the timeslot under observation to be minimized within a single-timeslot or multiple-timeslot observation period. This change ensures that an optimal reception is always achieved in varying channel conditions. The adaptivity parameter is a coefficient determining to what degree a channel estimate is changed on the basis of the error between the reference constellation and the actual sample. The higher the adaptivity parameter. the faster the resultant adaptation, which is preferable in rapidly changing channel conditions. On the other hand a low adaptivity parameter value typically results in better noise tolerance. In accordance with a preferred embodiment of the invention, a constant is added to or subtracted from the channel estimate adaptivity parameter in such a way that the change in the error metrics caused by the previous adaptivity parameter update causes the error metrics to decrease as a result of the addition/subtraction of the constant.

It is an advantage of the method of the invention that the same channel equalizer can be used in different types of channel conditions so that the operation of the channel equalizer is always optimized in accordance with the current channel.

The invention also relates to a self-optimizing channel equalizer/detector, which is adapted to receive signal samples within each symbol period over a timeslot, calculate reference constellation points within each symbol period on the basis of a channel estimate, update the channel estimate within each symbol period on the basis of an error between each sample point and reference constellation point, the error having been processed by one or more adaptivity parameters, define the signal path having the best error metrics in the timeslot on the basis of the error metrics calculated from the sample points on the basis of the channel estimate, and detect the bits corresponding to the signal path. whereby the channel equalizer/detector is characterized by being adapted to update one or more adaptivity parameters used in channel estimate update by timeslots in a direction which tends to decrease the error metrics of the best defined signal path within a single-timeslot or multiple-timeslot observation period, when being compared with the error metrics of a corresponding path in a previous timeslot. Such a channel equalizer/detector allows the advantages of the method of the invention to be achieved with a simple structure.

BRIEF DESCRIPTION OF THE DRAWINGS

The invention will be described in greater detail by means of preferred embodiments with reference to the attached drawings, in which.

DETAILED DESCRIPTION OF THE INVENTION

In the following the invention will be described in the TETRA system, but the invention is not to be restricted to any given system or modulation method.

Figure 2:
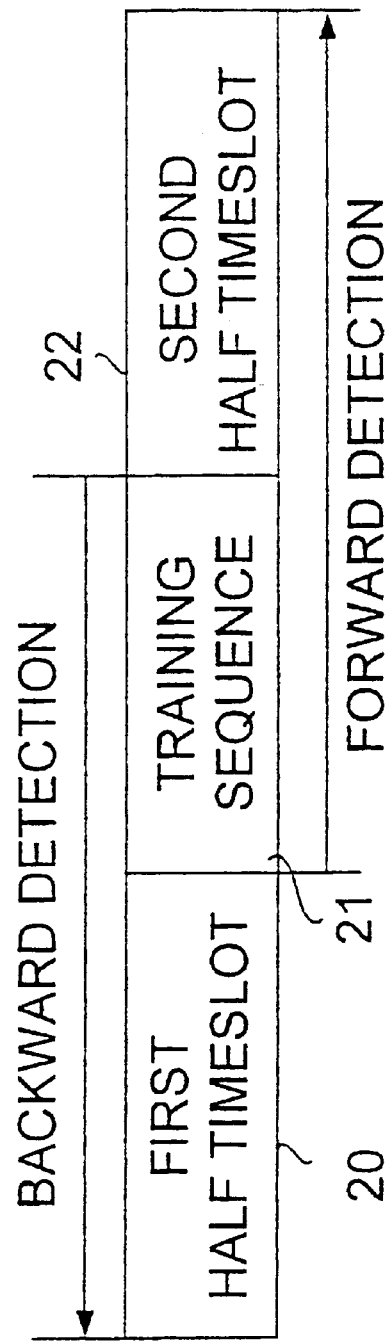
FIG. 2 is a simplified diagrammatic plan of a frame structure in the TETRA system.

In the TETRA system, information bits received from the management layer MAC (Medium Access Layer) are coded by block coding and convolution coding in order to be able to detect and possibly correct errors generated in the signal on the radio path. The coded bits are interleaved in such a way that successive bits are far apart. This facilitates error correction, should the signal to be transmitted be subjected to momentary interference on the radio path. The interleaved bits are mixed by a given colour code allowing the identification of transmissions by different base stations. In multiplexing, the bits of different logical channels are combined. The multiplexed bits are then used to form a burst. A burst is a structure sent in one TDMA (Time Division Multiple Access) timeslot or subtimeslot. A burst is composed of data bit fields 20 and 22 and a training sequence 21 between them in the middle of the burst as is shown in FIG. 2. Differential coding generates modulating symbols from the bit pairs of a burst. A carrier modulated by symbol control is amplified in a transmitter and transmitted to the radio path.

Figure 3A:
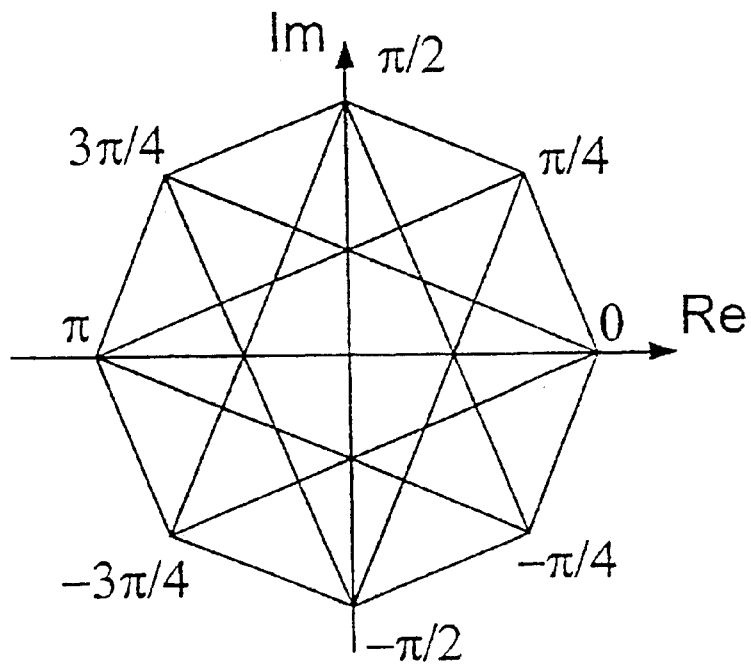
FIG. 3A is a phase shift diagram of π/4-DQPSK modulation
Figure 3B:
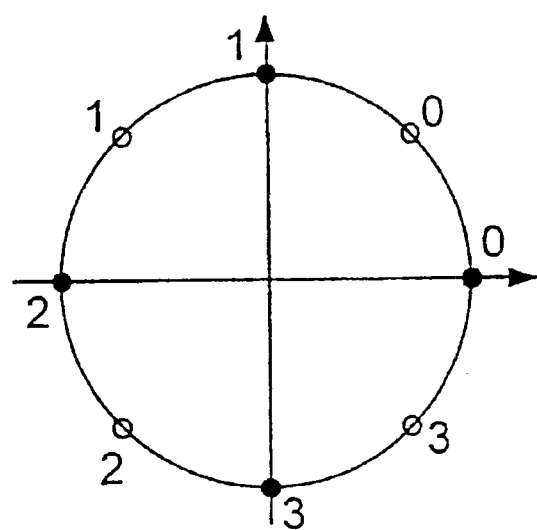
FIG. 3B shows the constellation points of π/4-DQPSK modulation.

The modulation employed is the above described π/4-DQPSK (π/4-shifted. Differential Quaternary Phase Shift Keying) modulation. This modulation method comprises eight phase states, but only four phase shifts. Allowed phase shifts (symbols) are ±π/4 and ±3π/4. In practice the π/4-DQPSK constellation thus varies at intervals of a symbol between two 4-point constellations, illustrated in FIG. 3B by four black points (1$^{st}$ constellation) and four white points (2$^{nd}$ constellation). As the symbol period changes, a shift may occur only from a white point to a black point and from a black point to a white point. Each of these eight constellation points can be represented by numbers 0 to 3, as is shown in FIG. 3B. Non-idealities of a radio channel may cause constellation points to shift.

Figure 1:
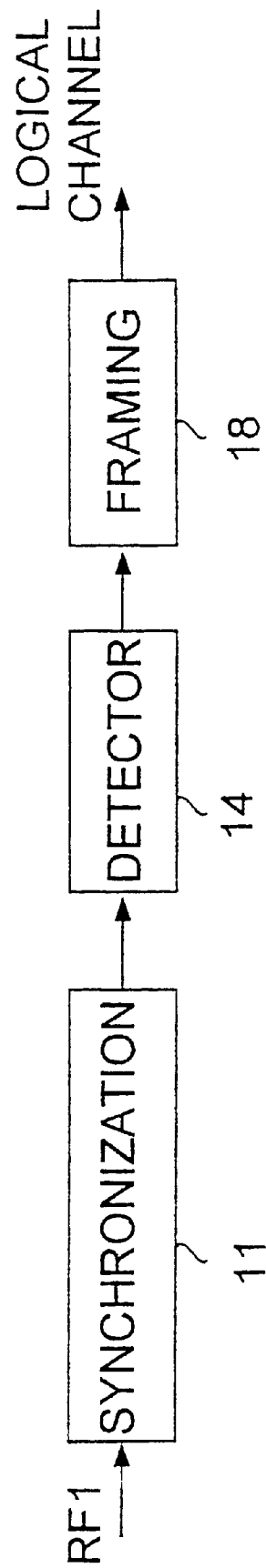
FIG. 1 is a flow diagram of a reception structure according to the TETRA system.

FIG. 1 is a block diagram of a receiver structure according to the invention for e.g. the TETRA system. Only the receiver parts essential to the description of the invention are shown. Upon reception, a signal is received from an antenna (not shown) and radio-frequency parts first process the signal. Samples are then taken with an A/D converter (not shown) from an intermediate-frequency signal. The samples are applied to a synchronization block 11, as is illustrated in FIG. 1 by a signal RF1. The synchronization block 11 searches the obtained samples for the training sequence associated with the frame structure and uses it to accurately determine the sampling moment, i.e. locations of all symbols in the sample flow. The synchronization block also controls the radio-frequency parts of the receiver so as to maintain a signal arriving at the AND converter at an optimal level. The synchronization block applies the frame to a channel equalizer and detector block 14. The channel equalizer equalizes non-idealities caused by the radio path channel and the associated detector detects the information bits. Finally a logical channel is formed from the frame in framing 18 and sent to further processing.

In the above an example of the general structure of a receiver has been described to facilitate understanding the invention. However, the structure of the receiver may change without deviating from the present invention, which is directed to a channel equalizer/detector of a receiver.

Figure 4:
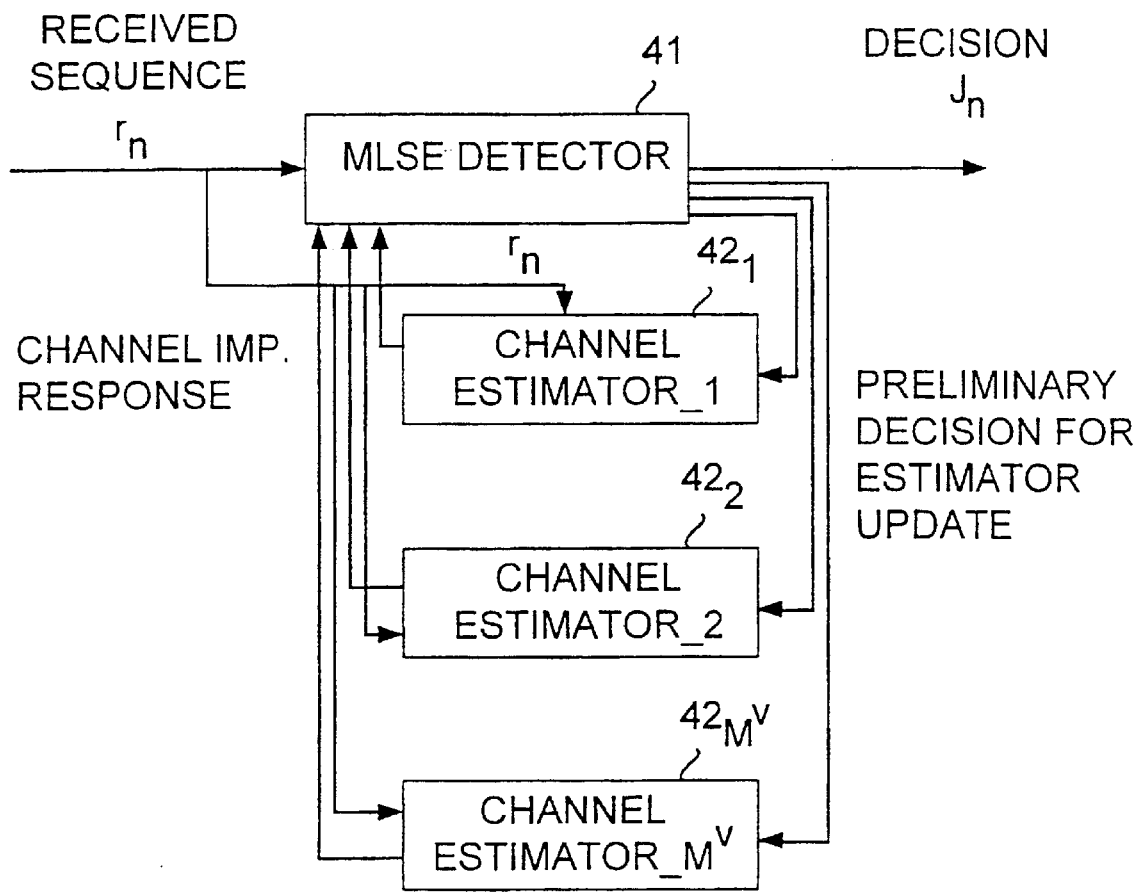
FIG. 4 is a block diagram of an adaptive MLSE detector and related channel estimators in accordance with an embodiment.

In a primary embodiment of the invention the MLSE detector is provided with the Viterbi algorithm. An adaptive MLSE detector thus comprises a Viterbi detector 41 and at least one adaptive channel estimator $42_a$ (a=1 to M'), as is shown in FIG. 4. The Viterbi detector 41 estimates a transmitted sequence $r_n$ by means of a description created by the channel estimator $42_a$ of the impulse response of the radio channel. The channel estimator $42_a$ adaptively estimates the impulse response of the radio channel by means of decisions $J_n$ produced by the Viterbi detector 41 or by means of preliminary decisions. In accordance with the invention, one channel estimate corresponds to each sequence of the Viterbi detector. These estimates can be realized by one common channel estimator, but this would impair the tracing capability of the channel estimator. The embodiment shown in FIG. 4 comprises a plurality of parallel channel estimators $42_a$, preferably as many as there are sequences.

It is typical of the radio path that a transmitted signal arrives at a receiver along a plurality of propagation paths, each having a specific time delay, channel properties also changing as a function of time. E.g. beams reflected and delayed on the radio path cause so-called inter-symbol interference (ISI). The frequency response or impulse response of a channel can be estimated by a discrete-timed filter, a channel estimator, whose tap coefficients model the radio channel. A channel estimator is used to describe the state of a radio channel.

In the present description a channel estimator refers generally to a mechanism for estimating and maintaining a description of the complex impulse response of a radio channel. A method of updating the channel estimate is an essential part of this mechanism. In the TETRA system, the LMS (Least Mean Square) algorithm can be used to update channel estimates. In order to ensure the convergence of the LMS algorithm before the beginning of actual information bits, the detector 14 has to get an optimal initial estimate for the state of the channel. This estimate is obtained from the synchronization 11, which, when searching for an optimal sampling moment, calculates a complex cross correlation between the training sequence 21 of a received signal and a stored version of the training sequence. As a result of the cross correlation result, an initial value is obtained for the channel estimate, the value depicting the average state of the channel during a training sequence. Channel equalization and symbol detection is never started until the training sequence has been received. This is because symbol synchronization is able to adjust symbol timing as accurately as possible and generate an initial channel estimate. Both forward and backward channel equalization is performed after estimate initialization by always training the detector 14 across the training sequence 21 towards the end of the burst or, correspondingly, towards the beginning, as FIG. 2 shows.

The Viterbi algorithm is a method of searching for a trellis for a signal path corresponding to maximum probability among a number of signal paths, in which one channel estimate corresponds to each signal path. At each stage of the trellis search, $M^L$ sequences propagate in the detector, each of which has specific path metrics based on Euclidean distance. Information on the current state of the channel, i.e. the channel estimate, is used to construct reference constellation points. Once the reference constellation point has been calculated and selected on the basis of the best signal path, the difference between the reference point and the received sample can be calculated for each channel estimate. This error can be used to update the channel estimator. The error metrics of a given signal path are calculated by summing up the error metrics, i.e. square errors, of all points in the signal path. Channel estimate update by the LMS algorithm takes place in accordance with the following formulae at intervals of a symbol period:

$$ch\_est\_I(n)=ch\_est\_I(n-1)+\alpha(err\_I(n)*const\_I(n)+err\_Q(n)*const\_Q(n)),$$

$$ch\_est\_Q(n)=ch\_est\_Q(n-1)+\alpha(-err\_I(n)*const\_Q(n)+err\_Q(n)*const\_I(n)),$$

wherein:
- ch_est_I=I-parameter of the channel estimate;
- ch_est_Q=Q parameter of the channel estimate;
- err_I=I parameter of the error;
- err_Q=Q-parameter of the error;
- const_I=I co-ordinate of a constellation point;
- const_Q=Q-co-ordinate of a constellation point;
- α=adaptivity parameter.

The adaptivity parameter a used in channel estimate update serves to adapt the channel equalizer/detector to different types of channel conditions. A rapidly changing channel requires a high adaptivity parameter value. On the other hand, a low adaptivity parameter value results in better noise tolerance.

In accordance with the method of the invention, the adaptivity parameter α is first initialized to a value, e.g. 0.4. Samples are taken from a timeslot within each symbol period and the signal path having the best error metrics in the timeslot is defined, the path being used to detect the bits in the timeslot. Next the error metrics of the best path in the timeslot are compared with the best error metrics of previous timeslots. If the error metrics of the path are smaller than the reference metrics, a small constant (e.g. 0.05) is added to the adaptivity parameter α, the constant having the same sign as the previous addition. If the error metrics of the path are higher than the reference metrics, a small constant (e.g. 0.05) is added to the adaptivity parameter α, the constant having an opposite sign to that of the previous addition. Next the better of the error metrics is selected for use in the comparison of the next timeslot and multiplied by a kind of oblivion coefficient (e.g. 1.05) before the comparison of the following timeslot. The coefficient serves to take into account the fact that with time the error metrics are decreasingly up-to-date as e.g. the channel changes, and this way the error metrics value is intentionally impaired as it ages. A new adaptivity parameter a is used in the reception of the following timeslot, and the process continues in the above manner by the following timeslot being sampled.

Even though this embodiment description describes the utilization of the method of the invention in the TETRA system employing π/4-DQPSK modulation, it does in no way restrict the use of the method of the invention also in other types of systems. Consequently, the modulation method employed can be another method and similarly, another detection algorithm may be used instead of the Viterbi algorithm. Furthermore, instead of one adaptivity parameter, several adaptivity parameters may be used.

It is obvious to a person skilled in the art that as technology advances, the inventive concept can be implemented in several different ways. Thus the invention and its embodiments are not limited to the examples described above, but may vary within the scope of the claims.

What is claimed is:

1. A self-optimizing channel equalization and detection method comprising the steps of:
   receiving a signal,
   taking samples of the signal within each symbol period over a timeslot,
   calculating reference constellation points within each symbol period on the basis of a channel estimate,
   updating the channel estimate within each symbol period on the basis of an error between each sample point and the reference constellation point, the error having been processed by one or more adaptivity parameters, and
   defining, for bit detection, the signal path having the best error metrics in the timeslot on the basis of the error metrics calculated from the sample points on the basis of the channel estimate, wherein said one or more adaptivity parameters used in channel estimate update for processing the error is updated within each timeslot in a direction which tends to decrease the error metrics of the best defined signal path within a single-timeslot or multiple-timeslot observation period when being compared with the error metrics of a corresponding path in a previous timeslot.

2. A method as claimed in claim 1, comprising the step of comparing the error metrics of the best signal path in the timeslot under observation with the better error metrics of the comparison in the previous timeslot.

3. A method as claimed in claim 1, comprising the step of adding to one or more channel estimate adaptivity parameters a constant having the same sign as the previous addition, when the error metrics of the best path are smaller than the error metrics used as a reference value.

4. A method as claimed in claim 1, comprising the step of adding to one or more channel estimate adaptivity parameters a constant having an opposite sign to that of the previous addition, when the error metrics of the best path are higher than the error metrics used as a reference value.

5. A method as claimed in claim 1, comprising the step of multiplying the better error metrics of the comparison in a previous timeslot, used in comparing the error metrics, by a constant coefficient before the comparison.

6. A method as claimed in claim 1, wherein the absolute value of the constant to be added to the channel estimate adaptivity parameter being preferably 0.05.

7. A method as claimed in claim 1, wherein the constant, by which the better error metrics of the comparison in the previous timeslot are multiplied, being preferably 1.05.

8. A self-optimizing channel equalizer/detector, which is adapted to:
- receive signal samples within each symbol period over a timeslot,
- calculate reference constellation points within each symbol period on the basis of a channel estimate,
- update the channel estimate within each symbol period on the basis of an error between each sample point and reference constellation point, the error having been processed by one or more adaptivity parameters,
- define the signal path having the best error metrics in the timeslot on the basis of the error metrics calculated from the sample points on the basis of the channel estimate, and
- detect the bits corresponding to the signal path, and update said one or more adaptivity parameters used in channel estimate update for processing the error by timeslots in a direction which tends to decrease the error metrics of the best defined signal path within a single-timeslot or multiple-timeslot observation period, when being compared with the error metrics of a corresponding path in a previous timeslot.

9. A channel equalizer/detector as claimed in claim 8, further being adapted to compare the error metrics of the best signal path in the timeslot under observation with the better error metrics of the comparison in the previous timeslot.

10. A channel equalizer/detector as claimed in claim 8, further being adapted to add to one or more channel estimate adaptivity parameters a constant having the same sign as the previous addition, if the error metrics of the best path are smaller than the error metrics used as a reference value.

11. A channel equalizer/detector as claimed in claim 8, further being adapted to add to one or more channel estimate adaptivity parameters a constant having an opposite sign to that of the previous addition, if the error metrics of the best path are higher than the error metrics used as a reference value.

12. A channel equalizer/detector as claimed in claim 8, further being adapted to multiply the better error metrics of the comparison in the previous timeslot, used in comparing the error metrics, by a constant coefficient before the comparison.

* * * * *

UNITED STATES PATENT AND TRADEMARK OFFICE
CERTIFICATE OF CORRECTION

PATENT NO. : 6,438,185 B1
DATED : August 20, 2002
INVENTOR(S) : Mikko Huttunen

It is certified that error appears in the above-identified patent and that said Letters Patent is hereby corrected as shown below:

<u>Title page,</u>
Item [30], Foreign Application Priority Data, change "Mar. 22, 1998" to
-- Mar. 23, 1998 --.

Signed and Sealed this

Twentieth Day of May, 2003

JAMES E. ROGAN
*Director of the United States Patent and Trademark Office*